UNITED STATES PATENT OFFICE.

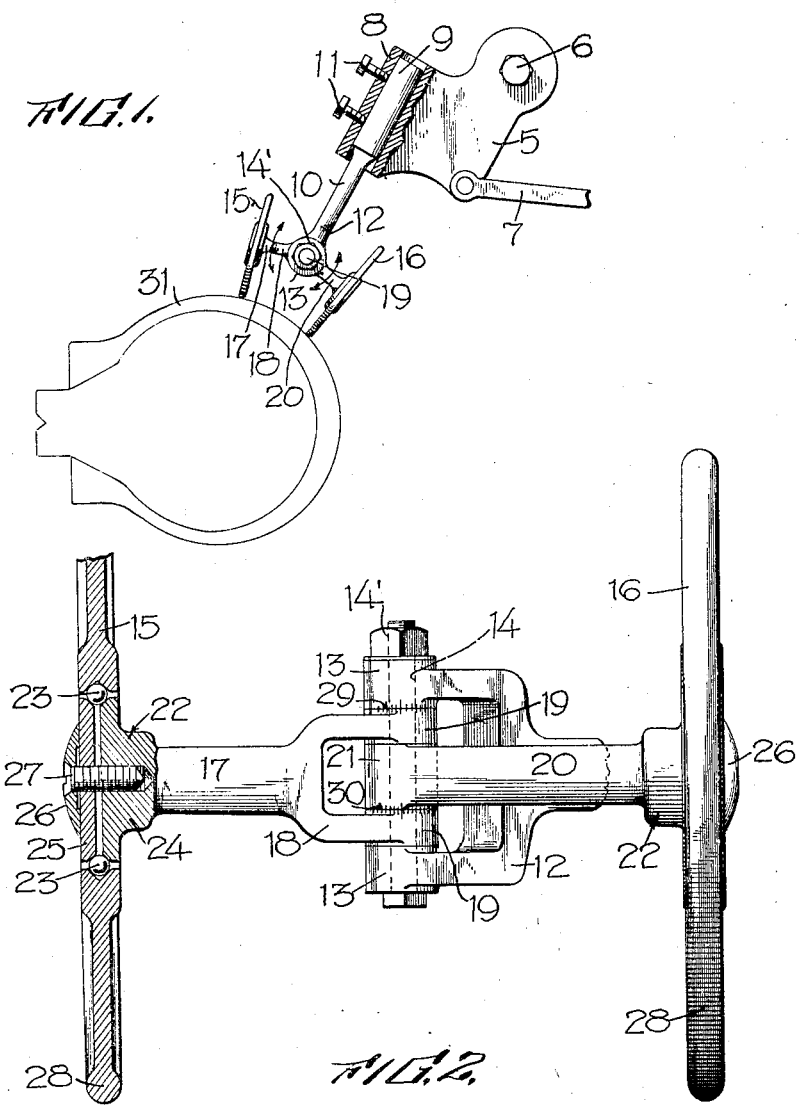

WILLIAM B. HARSEL, OF AKRON, OHIO, ASSIGNOR TO THE GOODYEAR TIRE & RUBBER COMPANY, OF AKRON, OHIO, A CORPORATION OF OHIO.

STITCHER APPARATUS OF TIRE-MAKING MACHINERY.

1,319,333.     Specification of Letters Patent.     Patented Oct. 21, 1919.

Application filed February 7, 1917. Serial No. 147,177.

*To all whom it may concern:*

Be it known that I, WILLIAM B. HARSEL, a citizen of the United States, residing at Akron, in the county of Summit and State of Ohio, have invented new and useful Improvements in Stitcher Apparatus of Tire-Making Machinery, of which the following is a specification.

My present invention relates to the stitcher-apparatus of tire-making machinery and more particularly comprehends improvements in stitchers of a compound form.

Stitchers, as the word is known to the tire-making art, include spinning disks or wheels, or other devices of a like nature, adapted to act upon a tire carcass and to lay the plies of the carcass in close conformity to the core upon which the carcass is builded. These ply-laying devices are either mechanically rotated or revolve because of their contact with the revoluble core against which they are thrust by either manually or power operated means. Stitchers are usually grouped in pairs to act upon the plies of a tire carcass on opposite sides of the tread portion, each of the stitchers being radially moved from crown to bead of the carcass.

It is a difficulty of frequent occurrence in the use of stitchers, however, that the angle of adjustment of the present type of stitching wheel to the tire surface is not capable of change in accordance with varying requirements of the work. Moreover, by the use of the single disk stitchers now commonly employed it is often necessary that a ply be restitched in order to secure it firmly upon the underlying ply, yet the operation of restitching any ply is one which consumes so much time that it becomes an important desideratum in the economic production of tires to insure the positive stitching down of each ply of a tire carcass by a single application of the stitchers.

Being cognizant of the above conditions, it has been one of the principal objects of my invention to provide a pair of double stitching disks commonly supported upon a single arm in such a manner that one of the disks follows the other about the side wall curvature of the tire as the two disks move along the tire circumference side by side in a narrowing spiral, thus insuring practically two stitching operations at once upon each lateral half of every ply of the tires. The compond stitcher obviates any necessity for restitching, owing to the double operation mentioned.

It is an object of equal importance with the foregoing to provide a compound or double stitcher in which a plurality of disks are mounted for independent adjustment with respect to the stitcher arm and to each other, in order that the angle which each makes with the tire surface may be varied in accordance with different conditions arising during the progress of the work.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a plan view of one portion of a stitching apparatus, showing the arrangement of a compound stitcher in conjunction with the diagrammatically shown carcass; and, Fig. 2 is an enlarged view taken at right angles to Fig. 1 showing the compound stitcher *per se*, one of the stitchers being illustrated in cross-section.

It is understood that the compound stitcher proposed by this invention may be employed in connection with any form of apparatus for moving the stitcher disks into contact with the tire carcass, or even of positively driving the separate stitcher disks themselves.

I have denoted by the numeral 5 a casting which is pivoted at 6 to a suitable portion of the stitcher carriage, and is operable upon by means of an arm 7 to control movement of the stitching disks into contact with the tire carcass, and out of such contact. The casting 5 is preferably formed with a sleeve 8 in which may be received the enlarged stem 9 of the stitcher arm 10, the stem 9 being maintained within its sleeve through the medium of any releasable fastening means such, for instance, as the set screws 11.

The projecting extremity of the stitcher arm 10 is formed as a U-shaped yoke 12, the yoke ends carrying bearing sleeves 13 in which is receivable a centering pin 14. The numerals 15 and 16 designate two stitching wheels or disks which are to be commonly associated with the stitcher arm 10. The wheel 15 is mounted upon a shaft 17 which is formed at one extremity with a yoke member 18 of such size that it will accurately fit between the bearings 13, and will also be receivable upon the centering pin 14. The other stitcher wheel 16 is carried upon a shaft 20 whose opposite extremity is formed with a bearing sleeve 21 which is centrally receivable between the arms of the stitcher yoke 18 and grouped therewith upon the centering pin 14.

The stitcher wheels are thus mounted for an independent movement with respect to the stitcher arm 10 and with respect to each other, the angle which either makes with the stitcher arm, or the angle which the stitcher shafts 17 and 20 make with each other being variable at will by the operator in accordance with any condition which may arise during the progress of the work. Any suitable securing means, such as the clamping nut 14' may be used to maintain the stitchers in their grouped position upon the centering pin.

Each of the stitching disks 15 and 16 is formed in the shape of a wheel mounted for movement with respect to a hub 22 carried upon its supporting shaft, the stitching disks being apertured for reception of the hub and both hub and wheel being provided with ball races or channels, in which may be accommodated antifriction bearings 23. The hub member 22 comprises, in the preferred practice, an outstanding annular flange 24 fixed upon the extremity of the stitcher shaft and a removable plate 25 which is grouped with the member 24, to form the whole hub, through the medium of a securing plate 26 and removable fastening means 27 of any desirable character. Each of the stitcher disks is given a beaded edge 28 which comes in direct contact with the tire carcass to be stitched down, and is capable of exerting the desired pressure thereon without injury to the fabric.

Preferably, I construct the adjustable yoke bearings 13 and 19 and the shaft bearing 21 of the same diameter in order that graduations 29 and 30 of any desirable scale may be employed on adjacent bearing edges to indicate to the operator the angles which the stitcher shafts 17 and 20 make with the stitcher arm 10 and with each other.

It is thought that the operation of the compound stitcher disclosed herein will now be apparent. It is understood, of course, that a pair of the compound stitchers such as has been disclosed is employed upon each stitcher carriage to be equipped, the stitcher illustrated in Fig. 1 operating upon one side wall portion of the carcass 31 only, and the equivalent means being employed upon the opposite side wall portion of such carcass.

If the operator has determined the angle at which the respective disks 15 and 16 of each stitcher arm should be operated, he is enabled to set the corresponding disks of the respective stitcher arms 10 at the same angle by an intelligent use of the scales 29 and 30 provided upon the bearing portions for the centering pin. As the casting member 5 mounting each of the stitcher arms is moved outwardly by means of its extension arm 7, the disk 16 will follow the disk 15 around the side wall curvature of the tire, repeating the work of the preceding stitcher and assuring the most effective laying down of the ply which is being operated upon. Should it be desired to use but a single one of the stitching disks, the other may be swung out of contact with the tire without in any way interfering with the adjustability of the wheel remaining in employment.

It is here desired to point out that the accomplishments of the present invention may be grouped under three main heads. First, the provision of a compound stitcher unit which is capable of more effective work than the old style single unit, and which may be so adjusted as to provide a single unit where such is found to be desirable. Second, the arrangement of stitching disks of either a compound or single unit in such a manner that the angle which each disk makes with the surface of the tire carcass may be varied at the will of the operator, while, in the case of the compound stitching unit, the various stitching disks may be independently adjusted as regards the angular aspect of each individual stitcher to the supporting arm and also as regards the angular aspect of the stitchers to each other. The third phase of the present invention is more specific in its scope and is concerned with the particular arrangement of stitching disks and mounting means therefor set forth in the foregoing.

What I claim is:

1. A stitching unit including an arm; a pair of disks mounted for rotation upon said arm; and means for adjusting the disks upon the arm to alter the relative angularity of the planes of the disks.

2. A stitching unit adapted to travel along one side of a forming core, including an arm, a pair of stitching disks operative on the core simultaneously, and means for mounting said disks at the extremity of said arm, said mounting means permitting angular adjustment of the disks in respect to the arm and in respect to each other.

3. A stitching unit adapted to travel along one side of a forming core, including an arm, and a plurality of stitching disks mounted upon the arm and independently adjustable angularly with respect to the arm.

4. A stitching unit including an arm; a pair of stitching disks mounted upon said arm and independently adjustable for rotation in planes variable with respect to said arm; and means for determining the angularity of the plane of rotation for each disk with respect to said arm.

5. A stitching unit comprising an arm, a plurality of shafts pivotally connected to said arm at the same point thereof, and stitching disks mounted on said shafts.

6. A stitching unit comprising an arm provided with a yoke, a pivot pin on the yoke, a plurality of shafts connected to said pivot pin, and stitching disks mounted on said shafts.

7. A stitching unit adapted to traverse one side of a carcass-forming core and including a support and a pair of stitcher elements swinging on a common vertical axis formed on the support for varying the plane of angularity of one relatively to the other.

8. A stitching structure including a pair of disks adapted simultaneously to traverse the side of a forming core, shafts on which the disks are mounted having a common axis on which the shafts have a swinging movement relatively to each other, a stitcher arm on which the axes of the shafts are formed, and means for moving the arm in a radial direction with respect to the core and thereby effecting a traversing movement of the disks simultaneously and successively along the side of the core.

In testimony whereof I have signed my name in the presence of two subscribing witnesses.

WILLIAM B. HARSEL.

Witnesses:
  B. J. McDANEL,
  C. L. LANDON.

Copies of this patent may be obtained for five cents each, by addressing the "Commissioner of Patents, Washington, D. C."